United States Patent
Fan et al.

(10) Patent No.: US 10,880,746 B2
(45) Date of Patent: Dec. 29, 2020

(54) NETWORK CONNECTION METHOD, APPARATUS, STORAGE MEDIUM AND TERMINAL

(71) Applicant: Tencent Technology (Shenzhen) Company Limited, Shenzhen (CN)

(72) Inventors: Liangliang Fan, Shenzhen (CN); Lulu Xie, Shenzhen (CN); Yifu Wang, Shenzhen (CN); Bin Huang, Shenzhen (CN); Huan Xiao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 189 days.

(21) Appl. No.: 16/041,548

(22) Filed: Jul. 20, 2018

(65) Prior Publication Data

US 2018/0332041 A1    Nov. 15, 2018

Related U.S. Application Data

(63) Continuation-in-part of application No. PCT/CN2017/084630, filed on May 17, 2017.

(30) Foreign Application Priority Data

May 17, 2016 (CN) .......................... 2016 1 0327691

(51) Int. Cl.
*H04W 12/06* (2009.01)
*H04W 12/00* (2009.01)
(Continued)

(52) U.S. Cl.
CPC ............. *H04W 12/08* (2013.01); *H04W 4/21* (2018.02); *H04W 4/70* (2018.02);
(Continued)

(58) Field of Classification Search
None
See application file for complete search history.

(56) References Cited

U.S. PATENT DOCUMENTS

| 2009/0117883 A1* | 5/2009 | Coffing | H04W 4/21 |
| | | | 455/414.1 |
| 2013/0004142 A1* | 1/2013 | Grab | H04N 5/913 |
| | | | 386/259 |

(Continued)

FOREIGN PATENT DOCUMENTS

| CN | 104754565 A | 7/2015 |
| CN | 104869612 A | 8/2015 |

(Continued)

OTHER PUBLICATIONS

Tencent Technology, ISRWO, PCT/CN2017/084630, dated Jul. 28, 2017, 8 pgs.

(Continued)

*Primary Examiner* — Joseph P Hirl
*Assistant Examiner* — Hassan Saadoun
(74) *Attorney, Agent, or Firm* — Morgan, Lewis & Bockius LLP (57) ABSTRACT

A method for providing network connection to a smart device via a social networking application that is operating on a computing device different from the smart device is disclosed. The computing device obtains a device identifier of the smart device, and obtains a key of the smart device associated with the device identifier of the smart device from a social networking server. The key is pre-set to be uniquely associated with a device model of the smart device. The computing device encrypts configuration information of a target wireless network using the key associated with the smart device, to obtain encrypted configuration information. The target wireless network is currently accessed by the computing device. The computing device then broadcasts the encrypted configuration information. The smart device receives and decrypts the encrypted configuration informa- (Continued)

tion using a copy of the key stored on the smart device to access the target wireless network.

20 Claims, 5 Drawing Sheets

(51) Int. Cl.
| | | |
|---|---|---|
| *H04W 84/10* | (2009.01) | |
| *G06F 21/60* | (2013.01) | |
| *H04L 9/08* | (2006.01) | |
| *H04L 12/24* | (2006.01) | |
| *H04W 12/08* | (2009.01) | |
| *H04W 4/21* | (2018.01) | |
| *H04W 4/70* | (2018.01) | |
| *H04W 84/12* | (2009.01) | |

(52) U.S. Cl.
CPC ... *H04W 12/0023* (2019.01); *H04W 12/0609* (2019.01); *H04W 84/105* (2013.01); *H04W 84/12* (2013.01)

(56) References Cited

U.S. PATENT DOCUMENTS

| | | | |
|---|---|---|---|
| 2015/0312230 A1 | 10/2015 | Choi et al. | |
| 2017/0195313 A1* | 7/2017 | Kirkby | G06K 9/00718 |

FOREIGN PATENT DOCUMENTS

| | | |
|---|---|---|
| CN | 104993981 A | 10/2015 |
| CN | 105120456 A | 12/2015 |
| CN | 105142135 A | 12/2015 |
| CN | 105472699 A | 4/2016 |
| CN | 105933904 A | 9/2016 |

OTHER PUBLICATIONS

Tencent Technology, IPRP, PCT/CN2017/084630, dated Nov. 20, 2018, 6 pgs.

* cited by examiner

NETWORK CONNECTION METHOD, APPARATUS, STORAGE MEDIUM AND TERMINAL

PRIORITY CLAIM AND RELATED APPLICATION

This application is a continuation-in-part application of PCT/CN2017/084630, entitled "NETWORK CONNECTION METHOD, APPARATUS, STORAGE MEDIUM, AND TERMINAL" filed on May 17, 2017, which claims priority to Chinese Patent Application No. 201610327691.5, filed with the State Intellectual Property Office of the People's Republic of China on May 17, 2016, and entitled "NETWORK CONNECTION METHOD, APPARATUS, STORAGE MEDIUM AND TERMINAL", all of which are incorporated herein by reference in their entirety.

FIELD OF THE TECHNOLOGY

This application relates to the field of Internet technologies, and in particular, to a network connection method, apparatus, storage medium and terminal.

BACKGROUND OF THE DISCLOSURE

With the development of Internet technologies, increasingly more devices are capable of accessing a wireless network. The device capable of accessing a wireless network can be referred to as a smart device. Most household smart devices are not equipped with peripheral input units such as a screen and a keyboard. Therefore, these household smart devices usually need to rely on a terminal to access a wireless network.

Currently, a network connection method is provided, which specifically includes: broadcasting, by a terminal, configuration information of a currently accessed wireless network; and when receiving the configuration information of the wireless network, accessing, by a smart device, the wireless network on the basis of the configuration information of the wireless network.

All smart devices in a broadcast range of the terminal can receive the configuration information of the wireless network, and access the wireless network on the basis of the configuration information of the wireless network. Therefore, some malicious smart devices can also access the wireless network easily, and the network connection is insecure.

SUMMARY

An embodiment of this application provides a method for providing network connection to a smart device via a social networking application that is operating on a computing device different from the smart device. The method is performed by the computing device having one or more processors and memory storing a plurality of programs to be executed by the one or more processors. The computing device obtains a device identifier of the smart device and then obtains, from a social networking server that supports the social networking application, a key of the smart device associated with the device identifier of the smart device. The key is pre-set to be uniquely associated with a device model of the smart device. The computing device encrypts configuration information of a target wireless network using the key associated with the smart device, to obtain encrypted configuration information. The target wireless network is currently accessed by the computing device. The computing device then broadcasts the encrypted configuration information, so that the smart device receives and decrypts the encrypted configuration information using a copy of the key stored on the smart device to access the target wireless network using the configuration information retrieved from the decryption.

An embodiment of this application further provides a computing device configured to provide network connection to a smart device via a social networking application that is operating on the computing device. The computing device has one or more processors, and memory storing a plurality of programs, when executed by the one or more processors, cause the computing device to perform the aforementioned method for providing network connection to a smart device via a social networking application.

An embodiment of this application further provides a non-transitory computer readable storage medium storing a plurality of programs in connection with a computing device configured to provide network connection to a smart device via a social networking application that is operating on the computing device. The computing device has one or more processors, and the plurality of programs, when executed by the one or more processors, cause the computing device to perform the aforementioned method for providing network connection to a smart device via a social networking application.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes the implementations of this application in detail with reference to the accompanying drawings.

Before detailed descriptions of the embodiments of this application, an application scenario of the embodiments of this application is described first. Because most household smart devices are not equipped with peripheral input units such as a screen and a keyboard, these household smart devices usually need to rely on a computing device (e.g., a terminal, a mobile device) such as a mobile phone to access a wireless network. In some examples, the terminal can broadcast configuration information of a currently accessed wireless network, so that the smart device receives the configuration information of the wireless network, and accesses the wireless network on the basis of the configuration information of the wireless network. All smart devices in a broadcast range of the terminal can receive the configuration information of the wireless network, and access the wireless network on the basis of the configuration information of the wireless network. Therefore, some malicious smart devices can also access the wireless network easily, and the network connection is insecure.

Figure 1:
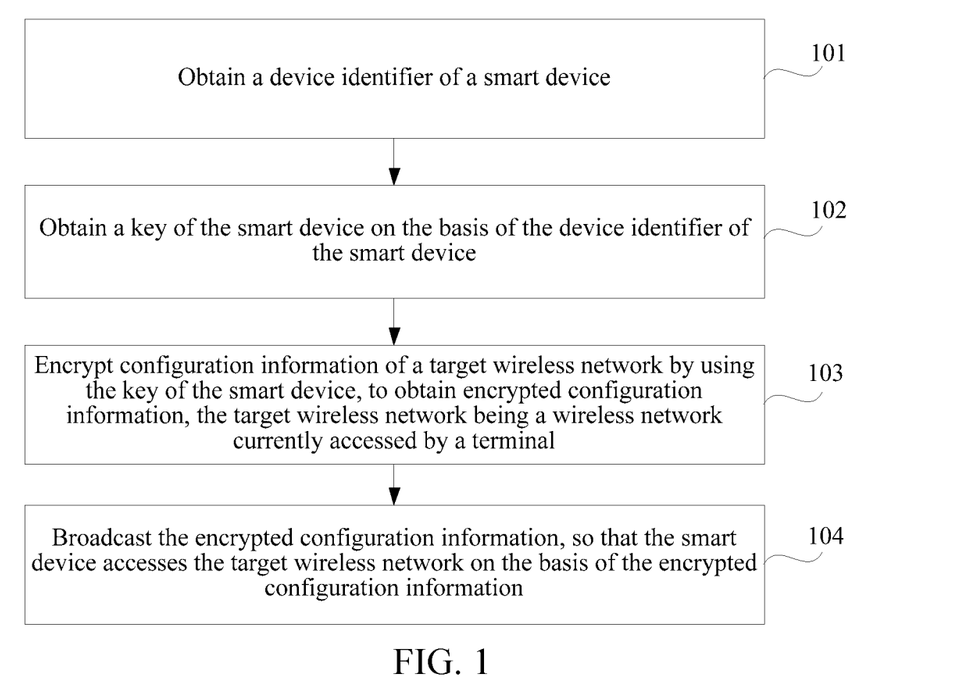
FIG. 1 is a flowchart of a network connection method according to an embodiment of this application.

Based on the foregoing technical problem, an embodiment of this application provides a network connection method that can be performed using a software application (e.g., a social networking application) operated on a computing device (e.g., a terminal or a terminal device). The application may be installed on a terminal, and the terminal may be connected to a wireless network while using the application. Referring to FIG. 1, the method includes the following steps:

Step 101: Obtain a device identifier of a smart device. In some embodiments, the computing device (e.g., the terminal) obtains a device identifier of the smart device by scanning a machine-readable code (e.g., a QR code or a bar code) to obtain the device identifier of the smart device. In some embodiments, the computing device may use an imaging device (e.g., a camera) to capture an image of an area displaying the device identifier and then perform image recognition to obtain the device identifier. In some embodiments, the social networking application (e.g., WeChat) may provide a user interface displayed on the computing device, and a user of the computing device may be prompted to enter the device identifier of the smart device in the user interface of the social networking application. In some other embodiments, the social networking application running at the computing device retrieves the device identifier of the smart device from a remote server by submitting a request accessing a third-party user account associated with the manufacturer of the smart device. The manufacturer of the smart device has logged into the social networking application through the third-party user account and registered the device identifier, device model, encryption/decryption key(s) associated with the smart device in advance.

Step 102: Obtain a key of the smart device associated with the device identifier of the smart device. In some embodiments, the computing device obtains a key (e.g., a predetermined encryption key, or randomly or pseudo-randomly generated encryption key by a certain algorithm) of the smart device based on the device identifier of the smart device from a social networking server (e.g., WeChat server) that supports the social networking application (e.g., through the third-party user account associated with the manufacturer of the smart device). In some embodiments, the key is pre-set to be uniquely associated with a device model of the smart device. In some embodiments, the key is also uniquely associated with the manufacturer or the vendor of the smart device. In some embodiments, the manufacturer or the vendor of the smart device registered with the social networking server to obtain a key uniquely associated with the device model. For example, the manufacturer or the vendor of the smart device may use the social networking application operating on a computing device (e.g., a mobile phone or a desktop computer). The networking application may provide a user interface for generating the key associated with the device model. In some embodiments, the key may be randomly generated or determined by the manufacturer or the vendor of the smart device. In some embodiments, after receiving the key on the user interface of the social networking application, the social networking server (which supports the social networking application) stores the key to be associated with the device model in a database. In some embodiments, the server may further store the key to be associated with the manufacturer or vendor of the smart device in the database at the server. In some embodiments, the manufacturer or the vendor of the smart device then writes/stores the key in the memory of the smart device.

Step 103: Encrypt configuration information of a target wireless network by using the key of the smart device, to obtain encrypted configuration information, the target wireless network being a wireless network currently accessed by a terminal. In some embodiments, the computing device encrypts configuration information of a target wireless network using the key of the smart device to obtain encrypted configuration information. The target wireless network is currently accessed by the computing device. In some embodiments, the configuration information includes a service set identifier (SSID) of the target wireless network and/or password of the target wireless network. In some embodiments, the computing device uses an encryption algorithm that is a standard algorithm, e.g., an Advanced Encryption Standard (AES), or any other algorithm.

Step 104: Broadcast the encrypted configuration information, so that the smart device accesses the target wireless network on the basis of the received encrypted configuration information. In some embodiments, the computing device broadcasts the encrypted configuration information to one or more devices within a range of communication of the computing device. In some embodiments, the smart device receives and decrypts the encrypted configuration information using a copy of the key stored on the smart device to access the target wireless network using the configuration information retrieved from the decryption. In some embodiments, the smart device receives the encrypted configuration information, decrypts the encrypted configuration information using a copy of the key stored on the smart device, retrieves the configuration information including the Wi-Fi SSID and password info etc., and then connects the Wi-Fi network using the configuration information. On the other hand, another smart device that does not match the manufacture and/or the device model does not have the key, thus even after receiving the encrypted configuration information broadcasted from the computing device, such smart device cannot decrypt the encrypted configuration information to retrieve the network configuration information.

By using the network connection method provided in this application, a computing device can obtain a device identifier of a smart device, obtain a key of the smart device associated with the device identifier of the smart device, and further encrypt configuration information of a target wireless network by using the key of the smart device, to obtain encrypted configuration information. Then, the encrypted configuration information is broadcasted. Because the configuration information of the target wireless network is encrypted by using the key of the smart device before being broadcasted, it can be ensured that only the smart device can decrypt the encrypted configuration information and access the target wireless network by using the decrypted configuration information. Other smart devices cannot decrypt the encrypted configuration information even if they receive the encrypted configuration information. Therefore, the security of the configuration information of the target wireless network is improved, and the security of the network connection is improved.

In some embodiments, the obtaining a key of the smart device associated with the device identifier of the smart device includes: sending a key obtaining request to a server, the key obtaining request carrying the device identifier of the smart device, so that the server searches for the key of the smart device associated with the device identifier of the smart device; and receiving the key of the smart device sent by the server.

In some embodiments, before the encrypting configuration information of a target wireless network by using the key of the smart device, to obtain encrypted configuration information, the method further includes: obtaining a service set identifier (SSID) of the target wireless network; receiving a password entered corresponding to the SSID of the target wireless network; and determining the SSID of the target wireless network and the password as the configuration information of the target wireless network.

In some embodiments, before the broadcasting the encrypted configuration information, the method further includes: obtaining a distribution network description of the smart device; and broadcasting the encrypted configuration information when it is determined, according to the distribution network description, that the smart device meets a distribution network condition.

In some embodiments, the obtaining a distribution network description of the smart device includes: sending a distribution network description obtaining request to a server, the distribution network description obtaining request carrying the device identifier of the smart device, so that the server searches for the distribution network description of the smart device on the basis of the device identifier of the smart device; and receiving the distribution network description of the smart device sent by the server.

In some embodiments, the obtaining a device identifier of a smart device includes: obtaining the device identifier of the smart device in response to a device identifier selection operation; or obtaining the device identifier of the smart device in response to a device identifier inputting operation; or scanning a graphic identification code of the smart device, and determining the device identifier of the smart device according to the graphic identification code.

In some embodiments, the key of the smart device is different from the device identifier of the smart device.

In some embodiments, the device identifier of the smart device is a device model of the smart device, and the device identifier of the smart device is used for identifying at least one smart device belonging to the device model; or when the device identifier of the smart device is a factory serial number of the smart device, the device identifier of the smart device is used for identifying one smart device.

In some embodiments, the key of the smart device is a key generated by a vendor of the smart device randomly, a key generated on the basis of the device identifier of the smart device, or a self-defined key.

Any of the foregoing optional technical solutions can be combined to form an optional embodiment of this application. Details are not described again in this embodiment of this application.

Figure 2:
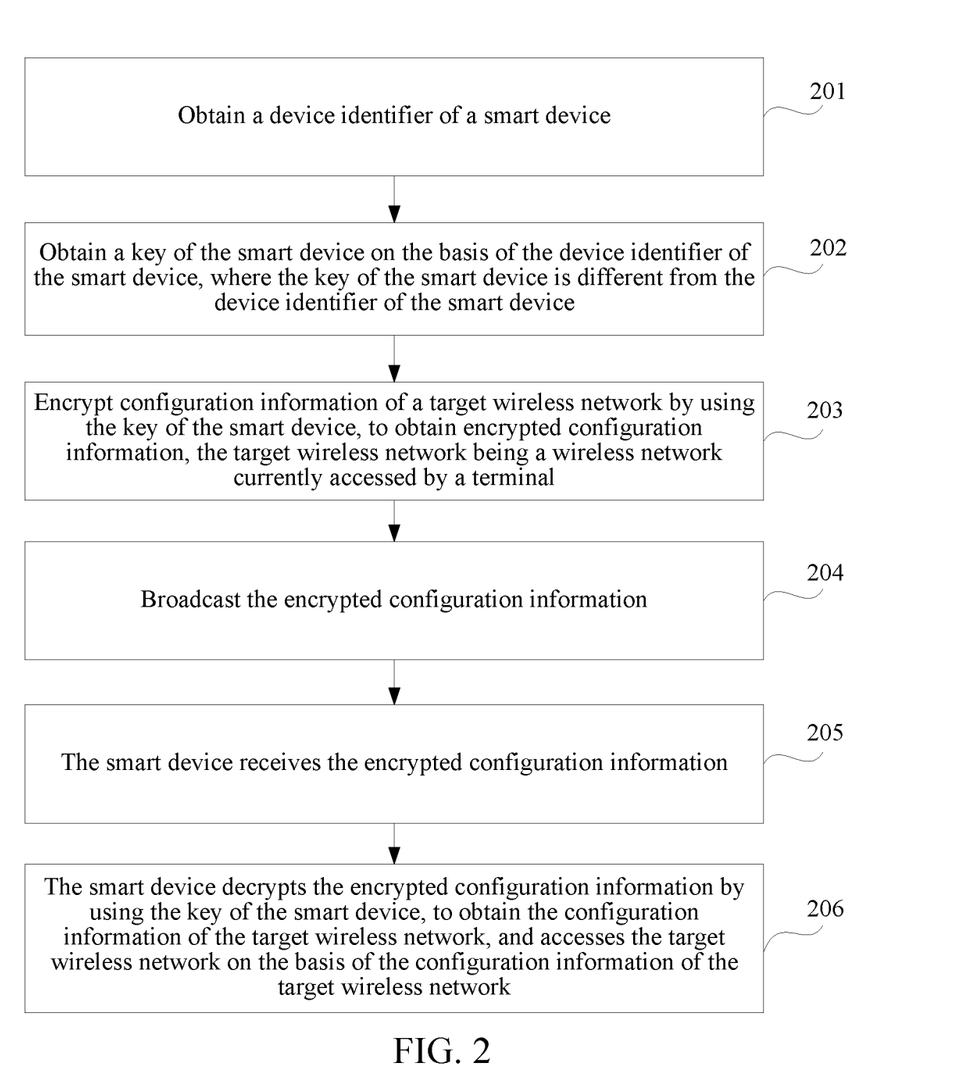
FIG. 2 is a flowchart of a network connection method according to another embodiment of this application.

FIG. 2 is a flowchart of a network connection method according to an embodiment of this application. The method is applied to a computing device that has a social networking application (e.g., WeChat) running on the computing device. The social networking application may be installed in a terminal, and the social networking application operates when the computing device has network connection. Referring to FIG. 2, the method includes the following steps:

Step 201: Obtain a device identifier of a smart device.

It should be noted that, the smart device may be a device with a built-in wireless fidelity (WiFi) chip and having a wireless network access capability, for example, a smart socket, a smart band, or a smart album, which is not specifically limited in this embodiment of this application.

In addition, the device identifier of the smart device may be a device model, a factory serial number, or the like of the smart device, which is not specifically limited in this embodiment of this application. Moreover, when the device identifier of the smart device is a device model of the smart device, the device identifier of the smart device is used for identifying at least one smart device belonging to the device model; when the device identifier of the smart device is a factory serial number of the smart device, the device identifier of the smart device is used for uniquely identifying one smart device.

Specifically, the device identifier of the smart device may be obtained in the following manner: when a terminal detects a selection instruction for a device identifier on a specified webpage, the selected device identifier is determined as the device identifier of the smart device. Alternatively, when the social networking application operating on a terminal detects a scanning instruction for a two-dimensional code of the smart device, the device identifier of the smart device is obtained from the two-dimensional code of the smart device. Alternatively, the social networking application running on a terminal may determine a device identifier input by a user on an identifier input page as the device identifier of the smart device. Definitely, the device identifier of the smart device may also be obtained in other manners, which are not specifically limited in this embodiment of this application.

It should be noted that, the specified webpage may be set in advance, multiple device identifiers may be displayed on the specified webpage, and the specified webpage may be a webpage provided by a vendor of the smart device, which is not specifically limited in this embodiment of this application.

In addition, when the specified webpage is a webpage provided by the vendor of the smart device, the terminal may obtain the device identifier of the smart device from the webpage through a specified interface, which is not specifically limited in this embodiment of this application. The specified interface may be set in advance. For example, the specified interface may be a JavaScript application programming interface (API), which is not specifically limited in this embodiment of this application.

It should be noted that, the two-dimensional code of the smart device is generated on the basis of the device identifier of the smart device. The two-dimensional code of the smart device carries device identifier information of the smart device. The two-dimensional code of the smart device may be generated by the vendor of the smart device, or may be obtained from a server by the vendor of the smart device, which is not specifically limited in this embodiment of this application.

In addition, the identifier input page is used for obtaining the device identifier. The identifier input page may be a page provided by the social networking application running on the terminal, such as a user interface, which is not specifically limited in this embodiment of this application.

It should be noted that, reference may be made to a related technology for the operation of obtaining the device identifier of the smart device, which is not elaborated in this embodiment of this application again.

Step 202: Obtain a key of the smart device associated with the device identifier of the smart device, where the key of the smart device is different from the device identifier of the smart device.

Specifically, the computing device may determine a key, which is corresponding to the device identifier of the smart device and input by the user on a key input page, as the key of the smart device. Alternatively, the computing device may send a key obtaining request to the server, where the key obtaining request carries the device identifier of the smart device. When receiving the key obtaining request, the server may obtain the key of the smart device associated with the device identifier of the smart device, and send the key of the smart device to the computing device. The computing device may receive the key of the smart device sent by the server. Definitely, the key of the smart device may also be obtained on the basis of the device identifier of the smart device in other manners, which are not specifically limited in this embodiment of this application.

It should be noted that, the key input page is used for obtaining the key. The key input page may be a page provided by the social networking application on a user interface, which is not specifically limited in this embodiment of this application.

In addition, the key obtaining request is used for requesting to obtain the key of the smart device.

For example, if the key which is corresponding to the device identifier of the smart device and input by the user on the key input page is 452, the computing device may determine the key 452 as the key of the smart device.

For another example, the computing device sends a key obtaining request to the social networking server, where the device identifier of the smart device carried in the key obtaining request is A. When receiving the key obtaining request, the server may obtain the key of the smart device associated with the device identifier A of the smart device. Assuming that the obtained key of the smart device is 452, the server may send the key 452 of the smart device to the computing device. The computing device may receive the key 452 of the smart device sent by the server.

When receiving the key obtaining request, the server may obtain the key of the smart device associated with the device identifier of the smart device by performing the following operation: the server obtains the key of the smart device from a stored correspondence between device identifiers and keys on the basis of the device identifier of the smart device.

For example, if the device identifier of the smart device is A, the server may obtain, on the basis of the device identifier A of the smart device, the key 452 of the smart device from the correspondence between device identifiers and keys shown in Table 1 below.

TABLE 1

| Device identifier | Key |
|---|---|
| A | 452 |
| B | 125 |
| ... | ... |

It should be noted that, in this embodiment of this application, the correspondence between device identifiers and keys shown in Table 1 is merely used as an example for description. Table 1 does not limit this embodiment of this application.

Further, before obtaining the key of the smart device from the stored correspondence between device identifiers and keys on the basis of the device identifier of the smart device, the server may further obtain the device identifier of the smart device and the key of the smart device, and store the device identifier of the smart device and the key of the smart device into the correspondence between device identifiers and keys.

For example, if the device identifier of the smart device obtained by the server is A and the key of the smart device obtained by the server is 452, the server may store the device identifier A of the smart device and the key 452 of the smart device into the correspondence between device identifiers and keys shown in Table 1.

When obtaining the device identifier of the smart device and the key of the smart device, the server may determine a device identifier input on a first function setting page by the vendor of the smart device as the device identifier of the smart device, and determine a key, which is corresponding to the device identifier of the smart device and input by the vendor of the smart device on the first function setting page, as the key of the smart device.

It should be noted that, the first function setting page is used for setting the device identifier of the smart device and the key of the smart device. The first function setting page may be a page provided by the server, which is not specifically limited in this embodiment of this application.

In addition, in this embodiment of this application, that the server obtains the key of the smart device from the stored correspondence between device identifiers and keys on the basis of the device identifier of the smart device is merely used as an example for description. In actual application, the server may further obtain the key of the smart device associated with the device identifier of the smart device in other manners, which are not specifically limited in this embodiment of this application.

It should be noted that, in general cases, it is easy to obtain the device identifier of the smart device. Therefore, in order to improve the security of the key of the smart device, the key of the smart device is different from the device identifier of the smart device. The key of the smart device may be a key generated by the vendor of the smart device randomly, a key generated on the basis of the device identifier of the smart device, or a self-defined key, which is not specifically limited in this embodiment of this application. When the key of the smart device is any one of the foregoing three types of keys, the key of the smart device can be known by the server and the vendor of the smart device only. As such, security of the key of the smart device can be ensured.

Step 203: Encrypt configuration information of a target wireless network by using the key of the smart device, to obtain encrypted configuration information, the target wireless network being a wireless network currently accessed by a terminal.

Specifically, the configuration information of the target wireless network may be encrypted by using the key of the smart device on the basis of a specified encryption algorithm, to obtain the encrypted configuration information. Definitely, the configuration information of the target wireless network may be encrypted by using the key of the smart device on the basis of another encryption method,to obtain the encrypted configuration information. The encryption method is not specifically limited in this embodiment of this application.

It should be noted that, the configuration information of the target wireless network may include an SSID of the target wireless network, a password, or the like, which is not specifically limited in this embodiment of this application.

In addition, the specified encryption algorithm may be set in advance. For example, the specified encryption algorithm may be an Advanced Encryption Standard (AES), which is not specifically limited in this embodiment of this application.

Further, before the configuration information of the target wireless network is encrypted by using the key of the smart device to obtain the encrypted configuration information, the configuration information of the target wireless network may further be encoded by using a specified communications protocol, to ensure that the encrypted configuration information can be normally broadcasted subsequently.

Reference may be made to a related technology for the operation of encoding the configuration information of the target wireless network by using the specified communications protocol. Details are not described in this embodiment of this application.

It should be noted that, the specified communications protocol may be set in advance. For example, the specified communications protocol may be an AirKiss communications standard, which is not specifically limited in this embodiment of this application.

Further, before the configuration information of the target wireless network is encrypted by using the key of the smart device to obtain the encrypted configuration information, the configuration information of the target wireless network may further be obtained. Moreover, the target wireless network is a wireless network currently accessed by the terminal. Therefore, the configuration information of the target wireless network can be obtained directly, thereby improving efficiency of obtaining the configuration information. Definitely, it is also possible to obtain the SSID of the target wireless network first, then receive a password which is input corresponding to the SSID of the target wireless network, and determine the SSID of the target wireless network and the password as the configuration information of the target wireless network. In this case, the configuration information of the target wireless network cannot be obtained until the user inputs the password of the target wireless network, thereby improving the security of the configuration information of the target wireless network.

Step 204: Broadcast the encrypted configuration information.

Further, before the encrypted configuration information is broadcast, a distribution network description of the smart device may further be obtained, and the distribution network description of the smart device may be displayed, so that the user can know the distribution network condition of the smart device in time, thereby improving user experience.

It should be noted that, the distribution network description of the smart device is used for indicating a distribution network condition of the smart device. When a device condition of the smart device meets the distribution network condition, the smart device can receive the encrypted configuration information, and therefore can access the target wireless network on the basis of the encrypted configuration information. When the device condition of the smart device does not meet the distribution network condition, the smart device cannot receive the encrypted configuration information, and therefore cannot access the target wireless network.

In addition, in actual application, after knowing the distribution network condition of the smart device, the user may check whether the smart device meets the distribution network condition. When the smart device does not meet the distribution network condition, the user may trigger a stop instruction by using a specified operation, to stop broadcasting the encrypted configuration information. As such, it is avoided that the computing device continues broadcasting the encrypted configuration information unnecessarily when the smart device does not meet the distribution network condition, saving processing resources of the computing device.

It should be noted that, the specified operation may be set in advance. For example, the specified operation may be a single click operation, a double click operation, a voice operation, which is not specifically limited in this embodiment of the present disclosure.

In addition, the stop instruction is used for instructing to stop broadcasting the encrypted configuration information.

When obtaining the distribution network description of the smart device, the computing device may send a distribution network description obtaining request to the server, where the distribution network description obtaining request carries the device identifier of the smart device. When receiving the distribution network description obtaining request, the server may obtain the distribution network description of the smart device on the basis of the device identifier of the smart device, and send the distribution network description of the smart device to the computing device. The computing device may receive the distribution network description of the smart device sent by the server. The computing device may obtain the distribution network description of the smart device in other manners, which are not specifically limited in this embodiment of the present disclosure.

For example, the computing device sends a distribution network description obtaining request to the server, where the device identifier of the smart device carried in the distribution network description obtaining request is A. When receiving the distribution network description obtaining request, the server may obtain the distribution network description of the smart device on the basis of the device identifier A of the smart device. Assuming that the distribution network description of the smart device is distribution network description 1, the server may send the distribution network description 1 to the computing device. The computing device may receive the distribution network description 1 sent by the server.

When receiving the distribution network description obtaining request, the server may obtain the distribution network description of the smart device on the basis of the device identifier of the smart device by performing the following operation: the server obtains the distribution network description of the smart device from a stored correspondence between device identifiers and distribution network descriptions on the basis of the device identifier of the smart device.

For example, if the device identifier of the smart device is A, the server may obtain, on the basis of the device identifier A of the smart device, the distribution network description 1 of the smart device from the correspondence between device identifiers and distribution network descriptions shown in Table 2 below.

TABLE 2

| Device identifier | Distribution network description |
|---|---|
| A | distribution network description 1 |
| B | distribution network description 2 |
| . . . | . . . |

It should be noted that, in this embodiment of this application, the correspondence between device identifiers and distribution network descriptions shown in Table 2 is merely used as an example for description. Table 2 does not limit this embodiment of this application.

Further, before obtaining the distribution network description of the smart device from the stored correspondence between device identifiers and distribution network descriptions on the basis of the device identifier of the smart device, the server may further obtain the device identifier of the smart device and the distribution network description of the smart device, and store the device identifier of the smart device and the distribution network description of the smart device into the correspondence between device identifiers and distribution network descriptions.

For example, if the device identifier of the smart device obtained by the server is A and the distribution network description of the smart device obtained by the server is distribution network description 1, the server may store the device identifier A of the smart device and the distribution network description 1 of the smart device into the correspondence between device identifiers and distribution network descriptions shown in Table 2.

When obtaining the device identifier of the smart device and the distribution network description of the smart device, the server may determine a device identifier input on a second function setting page by the vendor of the smart device as the device identifier of the smart device, and determine a distribution network description, which is input by the vendor of the smart device on the second function setting page, as the distribution network description of the smart device.

It should be noted that, the second function setting page is used for setting the device identifier of the smart device and the distribution network description of the smart device. The second function setting page may be a page provided by the server, which is not specifically limited in this embodiment of this application.

In addition, in this embodiment of this application, that the server obtains the distribution network description of the smart device from the stored correspondence between device identifiers and distribution network descriptions on the basis of the device identifier of the smart device is merely used as an example for description. In actual application, the server may further obtain the distribution network description of the smart device on the basis of the device identifier of the smart device in other manners, which are not specifically limited in this embodiment of this application.

Step 205: The smart device receives the encrypted configuration information.

It should be noted that, after the computing device broadcasts the encrypted configuration information, a wireless router may receive the encrypted configuration information broadcasted by the computing device, and broadcast the encrypted configuration information again. Then, the smart device may receive the encrypted configuration information broadcasted by the wireless router.

In addition, in order to ensure that the smart device can receive the encrypted configuration information normally, when producing the smart device, the vendor of the smart device may develop functions of the smart device on the basis of a specified software development kit (SDK), to ensure an information receiving capability of the smart device.

It should be noted that, the specified SDK is used for developing functions of the smart device. The specified SDK may be set in advance, and may be obtained by the vendor of the smart device from a server. Definitely, the specified SDK may also be obtained by the vendor of the smart device in other manners, which are not specifically limited in this embodiment of this application.

Step 206: The smart device decrypts the encrypted configuration information by using the key of the smart device, to obtain the configuration information of the target wireless network, and accesses the target wireless network on the basis of the configuration information of the target wireless network.

When the smart device decrypts the encrypted configuration information by using the key of the smart device to obtain the configuration information of the target wireless network, if the configuration information of the target wireless network is encrypted on the basis of a specified encryption algorithm, the encrypted configuration information may be decrypted by using the key of the smart device on the basis of an inverse algorithm of the specified encryption algorithm. Definitely, if the configuration information of the target wireless network is encrypted by using another encryption method, the encrypted configuration information may be decrypted by using the key of the smart device on the basis of a decryption method corresponding to the another encryption method, which is not specifically limited in this embodiment of this application.

It should be noted that, in order to ensure that the smart device can decrypt the encrypted configuration information, when producing the smart device, the vendor of the smart device may store the key of the smart device into the smart device, to ensure a decryption capability of the smart device.

In addition, after the smart device decrypts the encrypted configuration information by using the key of the smart device, the obtained configuration information of the target wireless network is generally encoded. Therefore, after decrypting the encrypted configuration information, the smart device may further decode the decrypted configuration information, so that the smart device can recognize the configuration information of the target wireless network.

When the smart device decodes the decrypted configuration information, if the configuration information of the target wireless network is encoded by using a specified communications protocol, the decrypted configuration information may be decoded by using a specified static library corresponding to the specified communications protocol. Definitely, the decrypted configuration information may also be decoded in other manners, which are not specifically limited in this embodiment of this application.

It should be noted that, the specified static library is used for decoding the decrypted configuration information. The specified static library may be set in advance. For example, when the specified communications protocol is an AirKiss communications protocol, the specified static library may be an AirKiss static library, which is not specifically limited in this embodiment of this application.

Reference may be made to a related technology for the operation of accessing the target wireless network on the basis of the configuration information of the target wireless network. Details are not described in this embodiment of this application.

It should be noted that, in this embodiment of this application, when the device identifier of the smart device is the device model of the smart device, the key of the smart device is actually a key corresponding to the device model of the smart device. In other words, the at least one smart device belonging to this device model can all decrypt the encrypted configuration information and access the target wireless network on the basis of the decrypted configuration information. Therefore, the computing device can distribute the network to the at least one smart device belonging to this device model, which not only improves the security of the network connection but also improves the convenience of the network connection.

By using the network connection method provided in this application, a computing device can obtain a device identifier of a smart device, obtain a key of the smart device associated with the device identifier of the smart device, and further encrypt configuration information of a target wireless network by using the key of the smart device, to obtain encrypted configuration information. Then, the encrypted configuration information is broadcasted. Because the configuration information of the target wireless network is encrypted by using the key of the smart device before being broadcasted, it can be ensured that only the smart device can decrypt the encrypted configuration information and access the target wireless network by using the decrypted configuration information. Other smart devices cannot decrypt the encrypted configuration information even if they receive the encrypted configuration information. Therefore, the security of the configuration information of the target wireless network is improved, and the security of the network connection is improved.

Figure 3A:
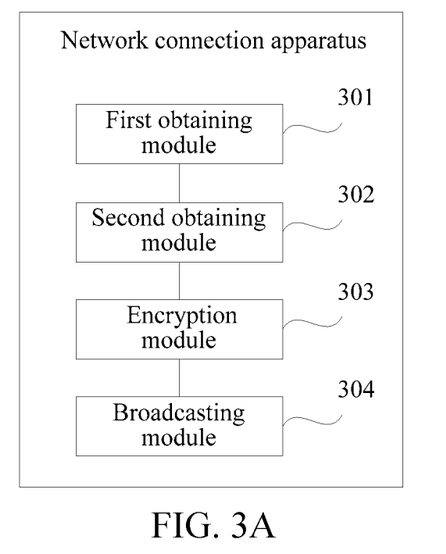
FIG. 3A is a schematic structural diagram of a network connection apparatus according to an embodiment of this application.

Referring to FIG. 3A, an embodiment of this application provides a network connection apparatus. The apparatus includes a first obtaining module 301, a second obtaining module 302, an encryption module 303 and a broadcasting module 304.

The first obtaining module 301 is configured to obtain a device identifier of a smart device;

The second obtaining module 302 is configured to obtain a key of the smart device associated with the device identifier of the smart device;

The encryption module 303 is configured to encrypt configuration information of a target wireless network by using the key of the smart device, to obtain encrypted configuration information, the target wireless network being a wireless network currently accessed by a terminal.

The broadcasting module 304 is configured to broadcast the encrypted configuration information, so that the smart device accesses the target wireless network on the basis of the received encrypted configuration information.

Figure 3B:
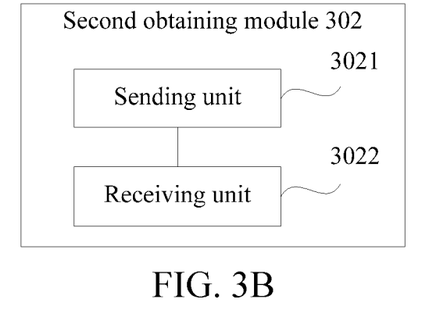
FIG. 3B is a schematic structural diagram of a second obtaining module according to an embodiment of this application.

In some embodiments, referring to FIG. 3B, the second obtaining module 302 includes a sending unit 3021 and a receiving unit 3022.

The sending unit 3021 is configured to send a key obtaining request to a server, the key obtaining request carrying the device identifier of the smart device, so that the server searches for the key of the smart device associated with the device identifier of the smart device.

The receiving unit 3022 is configured to receive the key of the smart device sent by the server.

Figure 3C:
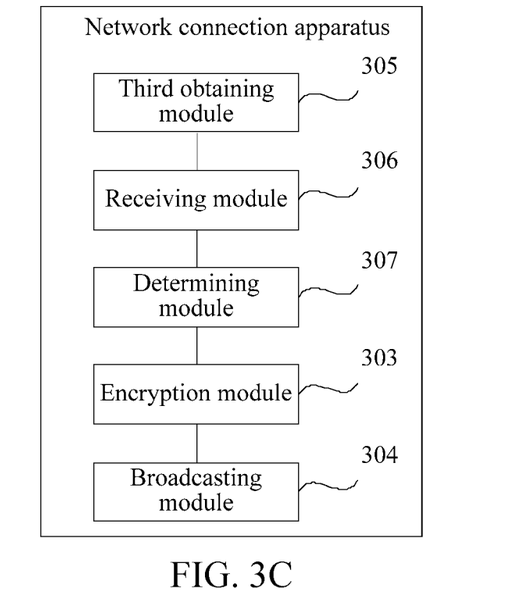
FIG. 3C is a schematic structural diagram of another network connection apparatus according to an embodiment of this application.

In some embodiments, referring to FIG. 3C, the apparatus further includes: a third obtaining module 305, a receiving module 306 and a determining module 307.

The third obtaining module 305 is configured to obtain an SSID of the target wireless network.

The receiving module 306 is configured to receive a password entered corresponding to the SSID of the target wireless network.

The determining module 307 is configured to determine the SSID of the target wireless network and the password as the configuration information of the target wireless network.

In some embodiments, the device identifier of the smart device is a device model of the smart device, and the device identifier of the smart device is used for identifying at least one smart device belonging to the device model; or when the device identifier of the smart device is a factory serial number of the smart device, the device identifier of the smart device is used for identifying one smart device.

In some embodiments, the key of the smart device is a key generated by a vendor of the smart device randomly, a key generated on the basis of the device identifier of the smart device, or a self-defined key.

By using the network connection apparatus provided in this application, a computing device can obtain a device identifier of a smart device, obtain a key of the smart device associated with the device identifier of the smart device, and further encrypt configuration information of a target wireless network by using the key of the smart device, to obtain encrypted configuration information. Then, the encrypted configuration information is broadcasted. Because the configuration information of the target wireless network is encrypted by using the key of the smart device before being broadcasted, it can be ensured that only the smart device can decrypt the encrypted configuration information and access the target wireless network by using the decrypted configuration information. Other smart devices cannot decrypt the encrypted configuration information even if they receive the encrypted configuration information. Therefore, the security of the configuration information of the target wireless network is improved, and the security of the network connection is improved.

It should be noted that, when the network connection apparatus provided in the foregoing embodiment performs network connection, division of the foregoing functional modules is only described for exemplary purposes. In an actual application, the foregoing functions may be allocated to be accomplished by different functional modules according to requirements, that is, the internal structure of the program interaction system is divided into different functional modules, to accomplish all or some of the foregoing functions. In addition, the network connection apparatus provided in the foregoing embodiment belongs to the same concept as the embodiment of the network connection method. For a specific implementation process of the network connection apparatus, refer to the method embodiment, and details are not described herein again.

Figure 4:
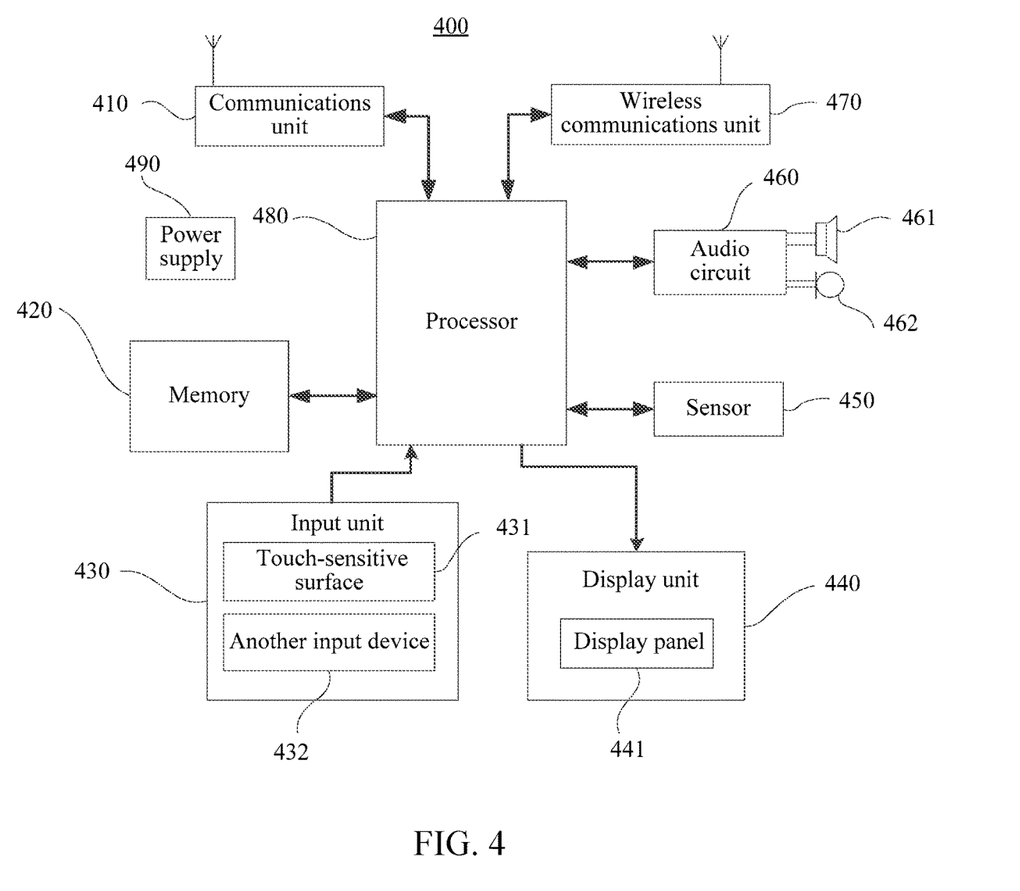
FIG. 4 is a schematic structural diagram of still another network connection apparatus according to an embodiment of this application.

FIG. 4 is a schematic diagram of a terminal of a network connection apparatus according to an embodiment of this application. Referring to FIG. 4, a terminal 400 may include components such as a communications unit 410, a memory 420 including one or more computer readable storage media, an input unit 430, a display unit 440, a sensor 450, an audio circuit 460, a wireless fidelity (WiFi) module 470, a processor 480 including one or more processing cores, and a power supply 490. A person skilled in the technology may understand that the structure of the terminal shown in FIG. 4 does not constitute a limitation to the terminal, and the terminal may include more or fewer components than those shown in the figure, or some components may be combined, or a different component deployment may be used.

The communications unit 410 may be configured to receive and send a signal during information transmission and receiving. The communications unit 410 may be a network communications device such as a radio frequency (RF) circuit, a router, or a modem. Especially, when the communications unit 410 is an RF circuit, it sends, after receiving downlink information of a base station, the information to one or more processors 480 for processing, and sends related uplink data to the base station. Generally, the RF circuit used as the communications unit includes but is not limited to an antenna, at least one amplifier, a tuner, one or more oscillators, a subscriber identity module (SIM) card, a transceiver, a coupler, a low noise amplifier (LNA), a duplexer, and the like. In addition, the communications unit 410 may also communicate with another device by means of wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 420 may be configured to store a software program and module. The processor 480 runs the software program and module stored in the memory 420, to implement various functional applications and data processing. The memory 420 may mainly include a program storage area and a data storage area. The program storage area may store an operating system, an application program required by at least one function (such as a sound playback function and an image display function), and the like. The data storage area may store data (such as audio data and an address book) created according to use of the terminal 400, and the like. In addition, the memory 420 may include a high speed random access memory, and may further include a non-volatile memory, such as at least one magnetic disk storage device, a flash memory, or other volatile solid-state storage devices. Correspondingly, the memory 420 may further include a memory controller, to provide access of the processor 480 and the input unit 430 to the memory 420.

The input unit 430 may be configured to receive input digit or character information, and generate a keyboard, mouse, joystick, optical or track ball signal input related to the user setting and function control. Preferably, the input unit 430 may include a touch-sensitive surface 431 and another input device 432. The touch-sensitive surface 431 may also be referred to as a touch display screen or a touch panel, and may collect a touch operation of a user on or near the touch-sensitive surface (such as an operation of a user on or near the touch-sensitive surface 431 by using any suitable object or attachment, such as a finger or a touch pen), and drive a corresponding connection apparatus according to a preset program. In some embodiments, the touch-sensitive surface 431 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 480. Moreover, the touch controller can receive and execute a command sent by the processor 480. In addition, the touch-sensitive surface 431 may be implemented by using various types, such as a resistive type, a capacitive type, an infrared type, and a surface acoustic wave type. In addition to the touch-sensitive surface 431, the input unit 430 may further include the another input device 432. Preferably, the another input device 432 may include, but is not limited to, one or more of a physical keyboard, a functional key (such as a volume control key or a switch key), a track ball, a mouse, and a joystick.

The display unit 440 may be configured to display information input by the user or information provided for the user, and various graphical user interfaces of the mobile terminal 400. The graphical user interfaces may be formed by a graph, a text, an icon, a video, and any combination thereof. The display unit 440 may include a display panel 441. In some embodiments, the display panel 441 may be configured by using a liquid crystal display (LCD), an organic light-emitting diode (OLED), or the like. Further, the touch-sensitive surface 431 may cover the display panel 441. After detecting a touch operation on or near the touch-sensitive surface 431, the touch-sensitive surface 431 transfers the touch operation to the processor 480, so as to determine a type of a touch event. Then, the processor 480 provides corresponding visual output on the display panel 441 according to the type of the touch event. Although, in FIG. 4, the touch-sensitive surface 431 and the display panel 441 are used as two separate parts to implement input and output functions, in some embodiments, the touch-sensitive surface 431 and the display panel 441 may be integrated to implement the input and output functions.

The terminal 400 may further include at least one sensor 450, such as an optical sensor, a motion sensor, and other sensors. The light sensor may include an ambient light sensor and a proximity sensor. The ambient light sensor may adjust luminance of the display panel 441 according to brightness of the ambient light. The proximity sensor may switch off the display panel 441 and/or backlight when the terminal 400 is moved to the ear. As one type of motion sensor, a gravity acceleration sensor may detect magnitude of accelerations in various directions (generally triaxial), may detect magnitude and a direction of the gravity when static, and may be used for an application that recognizes the attitude of the mobile phone (for example, switching between landscape orientation and portrait orientation, a related game, and magnetometer attitude calibration), and a function related to vibration recognition (such as a pedometer and a knock). Other sensors, such as a gyroscope, a barometer, a hygrometer, a thermometer, and an infrared sensor, which may be configured in the terminal 400 are not further described herein.

The audio circuit 460, a loudspeaker 461, and a microphone 462 may provide audio interfaces between the user and the terminal 400. The audio circuit 460 may transmit, to the loudspeaker 461, an electric signal converted from received audio data. The loudspeaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to another terminal by using the communications unit 410, or outputs the audio data to the memory 420 for further processing. The audio circuit 460 may further include an earphone jack, so as to provide communication between a peripheral earphone and the terminal 400.

To implement wireless communication, the terminal may be configured with a wireless communications unit 470. The wireless communications unit 470 may be a WiFi module. WiFi is a short distance wireless transmission technology. The terminal 400 may help, by using the wireless communications unit 470, the user to receive and send emails, browse a web page, access streaming media, and so on, which provides wireless broadband Internet access for the user. Although FIG. 4 shows the wireless communications unit 470, it may be understood that the wireless communications unit is not a necessary component of the terminal 400, and when required, the wireless communications unit may be omitted as long as the scope of the essence of the present disclosure is not changed.

The processor 480 is a control center of the terminal 400, which is connected to various parts of the entire mobile phone by using various interfaces and lines, and by running or executing a software program and/or module stored in the memory 420 and calling data stored in the memory 420, to perform various functions of the terminal 400 and process data, so as to perform overall monitoring on the mobile phone. The processor 480 may include one or more processing cores. Preferably, the processor 480 may integrate an application processor and a modem processor. The application processor mainly processes an operating system, a user interface, an application program, and the like. The modem processor mainly processes wireless communication. It may be understood that the foregoing modem processor may not be integrated into the processor 480.

The terminal 400 further includes the power supply 490 (such as a battery) for supplying power to the components. Preferably, the power supply may be logically connected to the processor 480 by using a power management system, thereby implementing functions such as charging, discharging, and power consumption management by using the power management system. The power supply 460 may further include one or more of a direct current or alternating current power supply, a recharging system, a power failure detection circuit, a power supply converter or inverter, a power supply state indicator, and any other component.

Although not shown in the figure, the terminal 400 may further include a camera, a Bluetooth module, and the like, which are not described herein.

In this embodiment, the terminal further includes one or more programs. The one or more programs are stored in the memory and are configured to be executed by one or more processors. The one or more programs include the following instruction for executing the network connection method provided in an embodiment of this application, including: obtaining a device identifier of a smart device; obtaining a key of the smart device associated with the device identifier of the smart device; encrypting configuration information of a target wireless network by using the key of the smart device, to obtain encrypted configuration information, the target wireless network being a wireless network currently accessed by a terminal; and broadcasting the encrypted configuration information, so that the smart device accesses the target wireless network on the basis of the received encrypted configuration information.

In some embodiments, the obtaining a key of the smart device associated with the device identifier of the smart device includes: sending a key obtaining request to a server, the key obtaining request carrying the device identifier of the smart device, so that the server searches for the key of the smart device associated with the device identifier of the smart device; and receiving the key of the smart device sent by the server.

In some embodiments, before the encrypting configuration information of a target wireless network by using the key of the smart device, to obtain encrypted configuration information, the method further includes: obtaining an SSID of the target wireless network; receiving a password entered corresponding to the SSID of the target wireless network; and determining the SSID of the target wireless network and the password as the configuration information of the target wireless network.

In some embodiments, before the broadcasting the encrypted configuration information, the method further includes: obtaining a distribution network description of the smart device; and broadcasting the encrypted configuration information when it is determined, according to the distribution network description, that the smart device meets a distribution network condition.

In some embodiments, the obtaining a distribution network description of the smart device includes: sending a distribution network description obtaining request to a server, the distribution network description obtaining request carrying the device identifier of the smart device, so that the server searches for the distribution network description of the smart device on the basis of the device identifier of the smart device; and receiving the distribution network description of the smart device sent by the server.

In some embodiments, the obtaining a device identifier of a smart device includes: obtaining the device identifier of the smart device in response to a device identifier selection operation; or obtaining the device identifier of the smart device in response to a device identifier inputting operation; or scanning a graphic identification code of the smart device, and determining the device identifier of the smart device according to the graphic identification code.

In some embodiments, the key of the smart device is different from the device identifier of the smart device.

In some embodiments, the device identifier of the smart device is a device model of the smart device, and the device identifier of the smart device is used for identifying at least one smart device belonging to the device model; or when the device identifier of the smart device is a factory serial number of the smart device, the device identifier of the smart device is used for identifying one smart device In some embodiments, the key of the smart device is a key generated by a vendor of the smart device randomly, a key generated on the basis of the device identifier of the smart device, or a self-defined key.

The instruction may also be a unit or a module configured to execute the instruction.

In this embodiment of this application, a computing device can obtain a device identifier of a smart device, obtain a key of the smart device associated with the device identifier of the smart device, and further encrypt configuration information of a target wireless network by using the key of the smart device, to obtain encrypted configuration information. Then, the encrypted configuration information is broadcasted. Because the configuration information of the target wireless network is encrypted by using the key of the smart device before being broadcasted, it can be ensured that only the smart device can decrypt the encrypted configuration information and access the target wireless network by using the decrypted configuration information. Other smart devices cannot decrypt the encrypted configuration information even if they receive the encrypted configuration information. Therefore, the security of the configuration information of the target wireless network is improved, and the security of the network connection is improved.

A person of ordinary skill in the art may understand that all or some of the steps of the foregoing embodiments may be implemented by using hardware, or may be implemented by a program instructing relevant software. The program may be stored in a computer readable storage medium. The storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A method for providing network connection to a smart device via a social networking application that is operating on a computing device different from the smart device, the method comprising:
at the computing device having one or more processors and memory storing a plurality of programs to be executed by the one or more processors:
obtaining a device identifier of the smart device using a camera of the computing device;
obtaining, from a social networking server that supports the social networking application, a key of the smart device associated with the device identifier of the smart device, wherein the key is pre-set to be uniquely associated with a device model of the smart device;
encrypting configuration information of a target wireless network using the key of the smart device, to obtain encrypted configuration information, wherein the target wireless network is currently accessed by the computing device; and
broadcasting the encrypted configuration information to a plurality of devices that are within a broadcast range of the computing device, including the smart device, so that the smart device receives and decrypts the encrypted configuration information using a copy of the key stored on the smart device to access the target wireless network using the configuration information retrieved from the decryption.

2. The method according to claim 1, wherein before encrypting the configuration information of the target wireless network, the method further comprises:
obtaining a service set identifier (SSID) of the target wireless network;
receiving a password entered corresponding to the SSID of the target wireless network; and
determining the SSID of the target wireless network and the password as the configuration information of the target wireless network.

3. The method according to claim 1, wherein before broadcasting the encrypted configuration information, the method further comprises:
obtaining a distribution network description of the smart device; and
broadcasting the encrypted configuration information when it is determined, according to the distribution network description, that the smart device meets a distribution network condition.

4. The method according to claim 3, wherein obtaining the distribution network description of the smart device comprises:
sending a distribution network description obtaining request to the social networking server, the distribution network description obtaining request carrying the device identifier of the smart device, so that the server searches for the distribution network description of the smart device based on the device identifier of the smart device; and
receiving the distribution network description of the smart device from the social networking server.

5. The method according to claim 1, wherein obtaining a device identifier of the smart device comprises:
scanning a graphic identification code of the smart device using the camera of the computing device, and determining the device identifier of the smart device according to the graphic identification code.

6. The method according to claim 1, wherein the key of the smart device is different from the device identifier of the smart device.

7. The method according to claim 1, wherein the device identifier of the smart device is used for identifying at least one smart device belonging to the device model; or
when the device identifier of the smart device is a factory serial number of the smart device, the device identifier of the smart device is used for identifying one smart device of the device model.

8. The method according to claim 1, wherein the key of the smart device is a key generated by a vendor of the smart device randomly, a key generated based on the device identifier of the smart device, or a self-defined key.

9. A computing device configured to provide network connection to a smart device via a social networking application that is operating on the computing device, the computing device having one or more processors, and memory storing a plurality of programs, wherein the plurality of programs, when executed by the one or more processors, cause the computing device to perform operations comprising:
obtaining a device identifier of the smart device using a camera of the computing device;
obtaining, from a social networking server that supports the social networking application, a key of the smart device associated with the device identifier of the smart device, wherein the key is pre-set to be uniquely associated with a device model of the smart device;
encrypting configuration information of a target wireless network using the key associated with the smart device, to obtain encrypted configuration information, wherein the target wireless network is currently accessed by the computing device; and
broadcasting the encrypted configuration information to a plurality of devices that are within a broadcast range of the computing device, including the smart device, so that the smart device receives and decrypts the encrypted configuration information using a copy of the key stored on the smart device to access the target wireless network using the configuration information retrieved from the decryption.

10. The computing device according to claim 9, wherein before encrypting the configuration information of the target wireless network, the operations further comprise:
obtaining a service set identifier (SSID) of the target wireless network;
receiving a password entered corresponding to the SSID of the target wireless network; and
determining the SSID of the target wireless network and the password as the configuration information of the target wireless network.

11. The computing device according to claim 9, wherein before broadcasting the encrypted configuration information, the operations further comprise:
obtaining a distribution network description of the smart device; and
broadcasting the encrypted configuration information when it is determined, according to the distribution network description, that the smart device meets a distribution network condition.

12. The computing device according to claim 11, wherein obtaining the distribution network description of the smart device comprises:
sending a distribution network description obtaining request to the social networking server, the distribution network description obtaining request carrying the device identifier of the smart device, so that the server searches for the distribution network description of the smart device based on the device identifier of the smart device; and receiving the distribution network description of the smart device from the social networking server.

13. The computing device according to claim 9, wherein obtaining the device identifier of a smart device comprises:

scanning a graphic identification code of the smart device using the camera of the computing device, and determining the device identifier of the smart device according to the graphic identification code.

14. The computing device according to claim 9, wherein the key of the smart device is different from the device identifier of the smart device.

15. The computing device according to claim 9, wherein the device identifier of the smart device is used for identifying at least one smart device belonging to the device model; or when the device identifier of the smart device is a factory serial number of the smart device, the device identifier of the smart device is used for identifying one smart device of the device model.

16. The computing device according to claim 9, wherein the key of the smart device is a key generated by a vendor of the smart device randomly, a key generated based on the device identifier of the smart device, or a self-defined key.

17. A non-transitory computer readable storage medium storing a plurality of programs in connection with a computing device configured to provide network connection to a smart device via a social networking application that is operating on the computing device, the computing device having one or more processors, wherein the plurality of programs, when executed by the one or more processors, cause the computing device to perform operations comprising:

obtaining a device identifier of the smart device using a camera of the computing device;

obtaining, from a social networking server that supports the social networking application, a key of the smart device associated with the device identifier of the smart device, wherein the key is pre-set to be uniquely associated with a device model of the smart device;

encrypting configuration information of a target wireless network using the key associated with the smart device, to obtain encrypted configuration information, wherein the target wireless network is currently accessed by the computing device; and broadcasting the encrypted configuration information to a plurality of devices that are within a broadcast range of the computing device, including the smart device, so that the smart device receives and decrypts the encrypted configuration information using a copy of the key stored on the smart device to access the target wireless network using the configuration information retrieved from the decryption.

18. The non-transitory computer readable storage medium according to claim 17, wherein before encrypting the configuration information of the target wireless network, the operations further comprise:

obtaining a service set identifier (SSID) of the target wireless network;

receiving a password entered corresponding to the SSID of the target wireless network; and determining the SSID of the target wireless network and the password as the configuration information of the target wireless network.

19. The non-transitory computer readable storage medium according to claim 17, wherein before broadcasting the encrypted configuration information, the operations further comprise:

obtaining a distribution network description of the smart device; and broadcasting the encrypted configuration information when it is determined, according to the distribution network description, that the smart device meets a distribution network condition.

20. The non-transitory computer readable storage medium according to claim 17, wherein obtaining the device identifier of a smart device comprises:

scanning a graphic identification code of the smart device using the camera of the computing device, and determining the device identifier of the smart device according to the graphic identification code.

\* \* \* \* \*